(12) United States Patent
Kolluri et al.

(10) Patent No.: US 12,715,118 B2
(45) Date of Patent: Aug. 25, 2026

(54) CLOUD-BASED BELIEF WORLD UPDATES IN REAL-TIME ROBOTICS SYSTEMS

(71) Applicant: Intrinsic Innovation LLC, Mountain View, CA (US)

(72) Inventors: Bala Venkata Sai Ravi Krishna Kolluri, Fremont, CA (US); Stoyan Gaydarov, Burlingame, CA (US); David Andrew Schmidt, Munich (DE)

(73) Assignee: Intrinsic Innovation LLC, Mountain View, CA (US)

( * ) Notice: Subject to any disclaimer, the term of this patent is extended or adjusted under 35 U.S.C. 154(b) by 394 days.

(21) Appl. No.: 18/083,256

(22) Filed: Dec. 16, 2022

(65) Prior Publication Data

US 2024/0198516 A1 Jun. 20, 2024

(51) Int. Cl.
*B25J 9/16* (2006.01)

(52) U.S. Cl.
CPC ..... *B25J 9/163* (2013.01); *G05B 2219/31087* (2013.01); *G05B 2219/39001* (2013.01)

(58) Field of Classification Search
CPC ........... B25J 9/163; G05B 2219/31087; G05B 2219/39001
See application file for complete search history.

(56) References Cited

U.S. PATENT DOCUMENTS 6,308,113 B1 * 10/2001 Nowlin .................. B25J 9/1689 700/245
8,260,460 B2 9/2012 Sanders et al.
9,981,381 B1 5/2018 Nagarajan
10,166,677 B2 * 1/2019 Iba ......................... B25J 9/1664
11,351,680 B1 * 6/2022 Rosenberg ........... B25J 19/0095
2004/0128671 A1 7/2004 Koller et al.
2007/0208442 A1 9/2007 Perrone
2009/0254217 A1 10/2009 Pack et al.
2011/0071676 A1 3/2011 Sanders et al.
2012/0010772 A1 1/2012 Pack et al.
2017/0173795 A1 * 6/2017 Tan ........................ B25J 9/1661
2018/0229367 A1 8/2018 Lee et al.
2018/0229372 A1 * 8/2018 Breazeal .............. B25J 11/0015
2019/0042988 A1 * 2/2019 Brown ................ G06F 16/9535
(Continued)

FOREIGN PATENT DOCUMENTS

EP 3646997 5/2020
JP 2002187082 7/2002
(Continued)

OTHER PUBLICATIONS

International Search Report and Written Opinion in International Appln. No. PCT/US2022/026886, dated Aug. 9, 2022, 11 pages.
(Continued)

*Primary Examiner* — Ryan Rink
(74) *Attorney, Agent, or Firm* — Fish & Richardson P.C.

(57) ABSTRACT

Methods, systems, and media comprising; a physical robot in a physical workcell; an onsite execution subsystem that is configured to control the physical robot using a real-time control subsystem; a cloud-based belief world subsystem that is configured to receive and store sensor data captured in the workcell, wherein the onsite execution subsystem is configured to use sensor data stored by the cloud-based belief world subsystem in order to control the robot using the real-time control subsystem.

18 Claims, 3 Drawing Sheets

(56) References Cited

U.S. PATENT DOCUMENTS

| | | | | |
|---|---|---|---|---|
| 2019/0282175 | A1* | 9/2019 | Hill | G16H 40/67 |
| 2020/0001471 | A1 | 1/2020 | Chen et al. | |
| 2020/0070346 | A1 | 3/2020 | Oaki | |
| 2020/0233436 | A1 | 7/2020 | Fox et al. | |
| 2020/0276707 | A1 | 9/2020 | Go et al. | |
| 2021/0232149 | A1* | 7/2021 | Griffin | G06V 20/10 |
| 2021/0370504 | A1 | 12/2021 | Beardsworth et al. | |
| 2021/0405638 | A1* | 12/2021 | Boyraz | G06V 20/64 |
| 2022/0063091 | A1 | 3/2022 | Hasunuma et al. | |
| 2022/0134566 | A1* | 5/2022 | Holz | B25J 9/163 700/254 |
| 2022/0193901 | A1* | 6/2022 | Bokeloh | B25J 9/1692 |
| 2022/0314434 | A1 | 10/2022 | Kranski et al. | |
| 2022/0347841 | A1 | 11/2022 | Gaschler et al. | |
| 2022/0347844 | A1 | 11/2022 | Gaschler et al. | |
| 2022/0347846 | A1 | 11/2022 | Gaschler et al. | |
| 2022/0366246 | A1* | 11/2022 | Danihelka | G06N 3/08 |
| 2023/0273598 | A1* | 8/2023 | McDaniel | G06F 9/54 700/28 |
| 2023/0356395 | A1* | 11/2023 | Patnaikuni | G05B 19/4155 |
| 2024/0217103 | A1* | 7/2024 | Gomez Gutierrez | B25J 9/1666 |

FOREIGN PATENT DOCUMENTS

| | | |
|---|---|---|
| KR | 1020130017698 | 2/2013 |
| KR | 1020170034754 | 3/2017 |

OTHER PUBLICATIONS

International Search Report and Written Opinion in International Appln. No. PCT/US2022/026893, dated Aug. 16, 2022, 10 pages.

International Search Report and Written Opinion in International Appln. No. PCT/US2022/026894, dated Aug. 9, 2022, 10 pages.

Silva et al., "Implementing a distributed sensing and actuation system: the CAM BADA robots case study," 2005 IEEE Conference on Emerging Technologies and Factory Automation, Sep. 19-22, 2005, 8 pages.

* cited by examiner

CLOUD-BASED BELIEF WORLD UPDATES IN REAL-TIME ROBOTICS SYSTEMS

BACKGROUND

This specification relates to cloud-based belief world updates in real-time robotics systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position.

Real-time robotics control systems typically have an onsite execution subsystem having one or more computers that is used to drive one or more real-time control processes executed by processors on or near the robot itself. Because of the timing constraints, these computer systems are typically physically near or inside the robotic workcell that they control.

Some real-time robotics control systems ingest sensor information, e.g., force feedback or joint positions, from sensors that are integrated directly into the robotic workcell. However, these sensor systems are tightly bound to the real-time control cycle, and thus, during real-time operation, many aspects of what the robotic control system assumes about the state of the workcell, e.g., the position of fixtures and the robot itself, has to remain fixed.

SUMMARY

This specification relates to cloud-based belief world updates in robotics systems. Using these techniques, a robotics system can implement a cloud-based belief world in which a real-time robotics system can obtain sensor data from the cloud-based belief world. In other words, the cloud-based belief world is logically arranged between the robot in the workcell and the sensors capturing data in the workcell. This unconventional arrangement allows new capabilities that were not previously possible in real-time controls systems that are forced to assume that the physical world remains unchanged.

As used in this specification, a belief world represents the state of a workcell or a component within a workcell. The belief world of a workcell is determined through the interpretation of sensor data obtained from the workcell. Workcells can contain one or more robots instructed to perform certain tasks. These robots can use information relating to the current belief world to assist in completing a task, or to obtain pertinent information relating to the task. Belief worlds can be divided into individual "footprints," each footprint assigned to a different robotic component.

The belief world reconciles sensor data from a variety of equipment, sensors, and skills that contribute to the workcell belief worlds. The system can then provide updated belief worlds to the components of the workcell for use in real-time operation. In contrast to prior solutions, the belief worlds in this technique are updated based on a workcell-wide "trust" model between all workcell components, rather than only allowing components to update their individual footprint in the belief world. In some implementations, this trust based system can assign a figure-of-merit to different components within the workcell, and prioritize sensor data from the most trustworthy source. In some implementations, information relating to the real-time belief world can be provided to the individual components in the workcell, allowing components to gain insight into other belief world footprints that can assist in task completion, or alert the component to a future issue.

In some implementations, the cloud-based belief world can provide information relating to the current workcell belief world to remote clients and servers. This can allow offsite users to interact with and view the belief worlds of the workcell. In some cases, information relating to the workcell belief worlds over time can be recorded and replayed. These features allow for remote troubleshooting and event reconstruction.

Particular embodiments of the subject matter described in this specification can be implemented so as to realize one or more of the following advantages. Advantages can include allowing a remote troubleshooting ability leading to less system logistical requirements and a smaller carbon footprint, enhanced troubleshooting capability reducing system downtime, a smaller physical on-site footprint, increased system efficiency through greater component situational awareness, the ability to react in real-time to changes in the workcell, achieving the effectively unlimited data storage capacity of a cloud-based system, the ability to replay simulations remotely from the cloud, and the ability to allow remote devices to run simulations based on data stored in the cloud.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
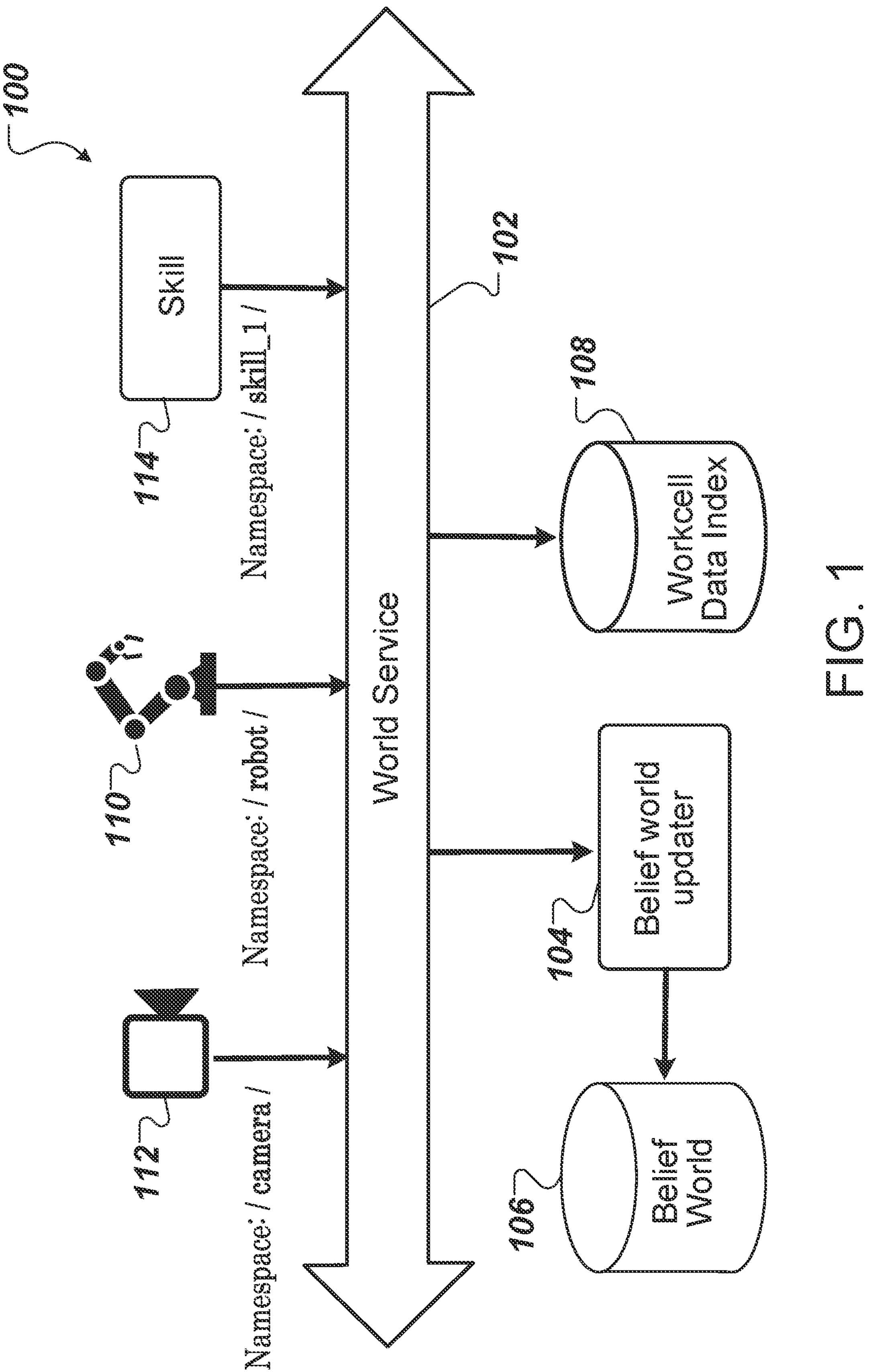
FIG. 1 is an overview of an example robotics system.

FIG. 1 is an overview of an example robotics system 100. The example robotics system 100 includes a world service 102 logically arranged between a robot and the sensor of a workcell, a belief world updater 104, one or more belief worlds 106, a workcell data index 108, one or more robots 110, one or more cameras 112, and one or more robotic skills 114.

In some implementations, robots 110 operating in the example robotics system 100 can have one or more associated belief worlds 106 corresponding to various components and skills 114. In some cases, sensor data associated with these components and skills 114 can be provided to the world service 102 via a network connection in order to determine these belief worlds 106. In some cases, the cloud-based belief world system can also receive sensor data from one or more cameras 112 that observe actions in the example robotics system 100.

In this specification, the belief-world being cloud-based means that the belief-world system is implemented by computers in a distributed computing system that is separate and distinct from the onsite control system and real-time processes that drive the robot in real-time operation that has the ability to make sensor data available to external systems through one or more application programming interfaces. The computing hardware implementing the cloud-based belief worlds described in this specification can be physically remote from and outside the facility that houses the robotic workcell being controlled, although in some implementations they can be located in the same facility. For example, with reference to the example system illustrated in FIG. 2, components on opposite sides of line 265 should be understood to be remote from each other. While these components have been indicated to be remote in this example, it should be understood that it is equally possible for them to be co-located in other examples. For example, while the belief world updater 104 is shown as being remote to the operating environment 220 in FIG. 2, it is equally possible for these two components to be co-located.

In either case, the cloud-based belief world is logically arranged between the sensors and the onsite execution system and the real-time control system that is driving the robot in real-time operation. In other words, the sensor information goes through the cloud-based belief world before being ingested by the onsite or real-time control systems. Examples of a distributed computing system as described in this specification can be a workcell located in New York with a separate client located in Philadelphia. Another example can be a workcell in Detroit with a belief world updater located in Los Angeles. It should be understood that there are endless possibilities as to the physical arrangement of the system components of this specification in a distributed computing system, and that these examples are simply for illustrative purposes.

In some implementations, the world service 102 can provide sensor data relating to the one or more belief worlds 106 to a belief world updater 104. In some cases, the belief world updater 104 interprets the sensor data and modifies the appropriate belief worlds 106 for the example robotics system 100. In some cases, the belief world updater 104 can also provide the updated belief worlds 106 to the world service 102 for transmission to the robots 110 and skills 114 operating in the example robotics system 100. In some cases, sensor data can also be stored in the world service 102 in a storage medium, for example, workcell data index 108.

In some implementations, the world service 102 can be implemented as a publish-subscribe messaging pattern. In some cases, this publish-subscribe messaging pattern can be a Data Distribution Service (DDS).

Figure 2:
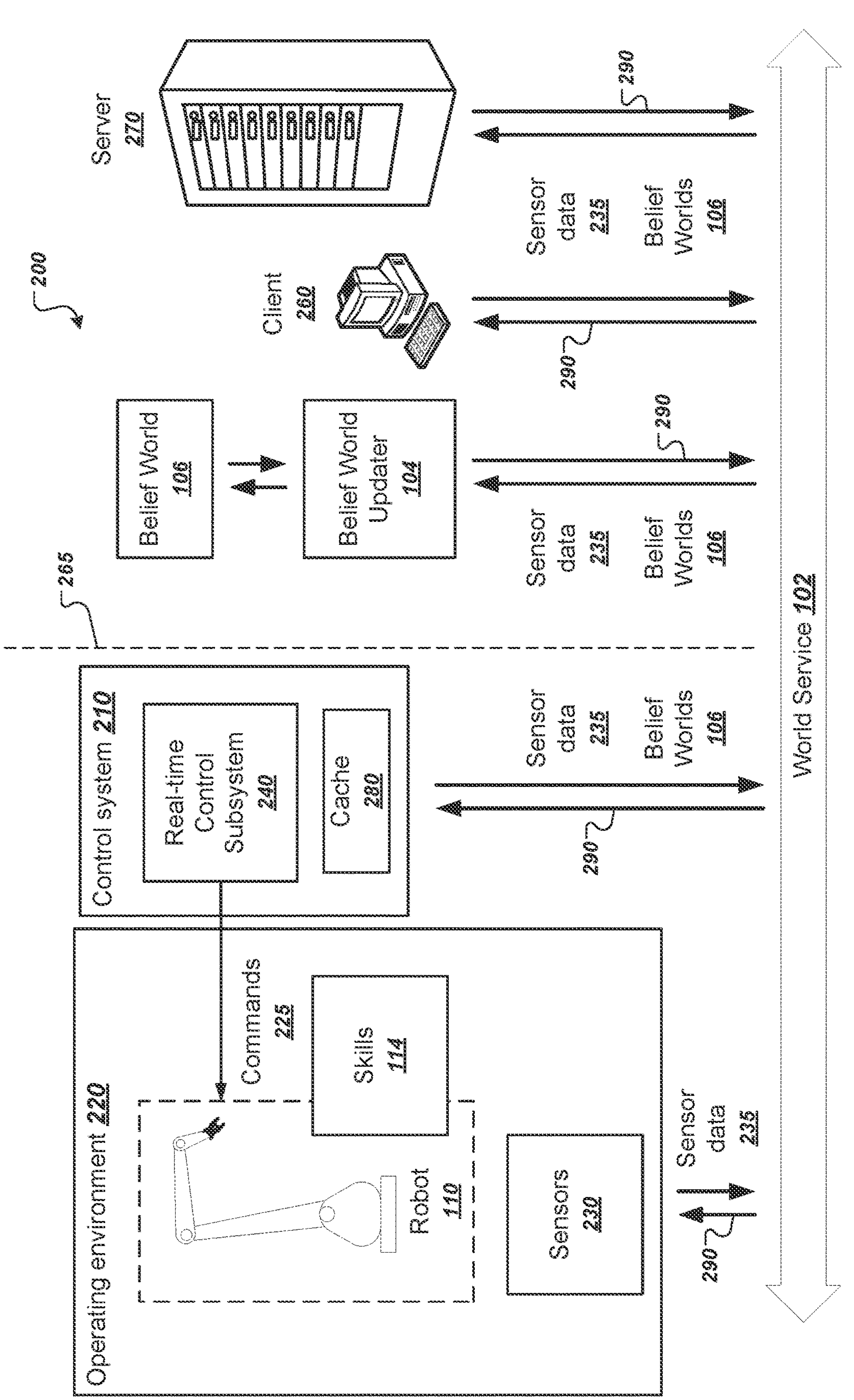
FIG. 2 is a detailed view of an example robotics system and cloud-based belief world system.

FIG. 2 is a detailed view of an example robotics system and cloud-based belief world system 200. The detailed view 200 includes the components of FIG. 1 and additionally includes an onsite execution subsystem in the form of control system 210 that contains a real-time control subsystem 240 and one or more caches 280, an operating environment 220 that contains one or more robots 110 and sensors 230, and one or more clients 260 and servers 270 in communication with the cloud-based belief world system 102 which is logically arranged between the robots 110 and sensors 230.

In some implementations, the world service 102 can be logically arranged such that it is in communication with one or more control systems 210 providing commands 225 to one or more operating environments 220. In some cases, this communication can include information relating to one or more belief worlds 106 and sensor data 235 associated with the operating environment 220.

In some implementations, information can be received by the control system 210 and stored in one or more local caches 280. In some cases, the transmitting of this information to the caches 280 by the world service 102 can be done continuously. In some cases, the real-time control subsystem 240 can read the information stored in cache 280 to issue commands 225 to the robots 110 and skills 114 of the operation environment 220. In some cases, caches 280 can be used to improve data transfer rates between the control system 210 and the world service 102 by storing frequently referenced information.

In some implementations, the information received from the world service 102 is processed by one or more real-time control subsystems 240 that issue commands 225 to robots 110 or skills 114 operating in operating environment 220. In some cases, these commands 225 can include real-time instructions to perform a certain task or complete an action. In some cases, commands 225 can reference information relating to the one or more belief states 106 or sensor data 235. In some cases, information regarding the belief worlds 106 or sensor data 235 can be provided to a different robot 110 or skill 114 than the robot 110 or skill 114 that originally generated the information.

In some implementations, the robots 110 and skills 114 operating in the operating environment 220 can be associated with one or more sensors 230. In some cases, these sensors can include force-torque sensors, optical sensors, accelerometers, cameras, or other sensors capable of being integrated with a robotics system. In some cases, these sensors 230 can provide sensor data 235 to the logically connected world service 102 through a publication-subscription messaging pattern 290. In some cases, this sensor data 235 can include information relating to the tasks or movements conducted by the robots 110 or skills 114 in operating environment 220. In some cases, the world service 102 can track the movements of objects in the workcell through its logical arrangement between the robots 110 and sensors 230, enabling the world service 102 to react to up-to-date position information.

As discussed in FIG. 1, the world service 102 can be in communication through a publication-subscription messaging pattern 290 with a belief world updater 104 that interprets sensor data 235 and updates one or more belief worlds 106. In some cases, the belief world updater 104 performs this process in real-time as actions are performed in the operating environment 220. In some cases, the belief world updater 104 can also provide updated belief worlds 106 to the world service 102 which can provide these updated belief worlds 106 to the one or more control systems 210. In some cases, the updated belief worlds are continually provided to the one or more control systems 210. In some cases, the belief world updater 104 can assign a trust figure-of-merit to different sources of sensor data, such that the updating of belief worlds can be managed in the event of conflicting sensor data. For example, an optical sensor can be assigned a higher trust figure-of-merit than a force-torque sensor, such that the sensor data 235 of the optical sensor would have precedence over the conflicting sensor data 235 of the force-torque sensor.

In some implementations, one or more clients 260 can be in communication with the world service 102 through a publication-subscription messaging pattern 290. In some cases, world service 102 can provide information relating to one or more belief worlds 106 and sensor data 235 to the clients 260. In some cases, the providing of this information can be performed by one or more application programming interfaces (API). In some cases, clients 260 can use this information to analyze the events occurring, or that have occurred, in operating environment 220. In some cases, this information can be stored on clients 260 for future reference. In some cases, the clients 260 can also provide instructions to the world service 102 to effectuate an action at the belief world updater 104, control systems 210, or operating environments 220. For example, the clients 260 can instruct one of the components connected to the world service 102 to create a simulated virtual workcell to replay events that occurred in the operating environment 220. In another example, the clients 260 can instruct the world service 102 to insert simulated geometry into the operating environment 220, such that these areas function as exclusion zones for robots 110 and skills 114 planning and executing tasks in the operating environment 220. In some implementations, one or more servers 270 can be in communication with the world service 102 through a publication-subscription messaging pattern 290. An example of such a server 270 can be the workcell data index 108 as described in FIG. 1. In some cases, world service 102 can provide information relating to one or more belief worlds 106 and sensor data 235 to the servers 270. In some cases, the providing of this information can be performed by one or more application programming interfaces (API). In some cases, this information can be stored on servers 270 for future reference. In some cases, the servers 270 can also provide instructions to the world service 102 to effectuate an action at the belief world updater 104, control systems 210, or operating environments 220. For example, the servers 270 can instruct one of the components connected to the world service 102 to create a simulated virtual workcell to replay events that occurred in the operating environment 220. In another example, the servers 270 can instruct the world service 102 to insert simulated geometry into the operating environment 220, such that these areas function as exclusion zones for robots 110 and skills 114 planning and executing tasks in the operating environment 220.

In some implementations, the information communicated to control system 210 can include a replay of belief worlds 106 or sensor data 235 from a previous operating session. In some cases, a replay can include a simulation of past belief worlds 106 or sensor data 235. Other examples of a replay can include the execution of a physical replay of actions in the operating environment 220 by manipulating the robots 110 or skills 114. For example, if a fault is routinely experienced at a certain point in execution, and analyzation of the belief worlds 106 and sensor data 235 does not reveal the cause, the system 200 can replay the physical actions in the operating environment 220 under direct observation for troubleshooting. In some cases, because the belief worlds 106 and sensor data 235 are made available over the world service 102, clients 260 and servers 270 not associated with the operating environment 220 can replay belief worlds 106 or sensor data 235 contained in the world service 102. For example, a client 260 can decide to replay a simulation of actions in operating environment 220 with a substitution of different robots 110 or skills 114 familiar to the client 260.

Figure 3:
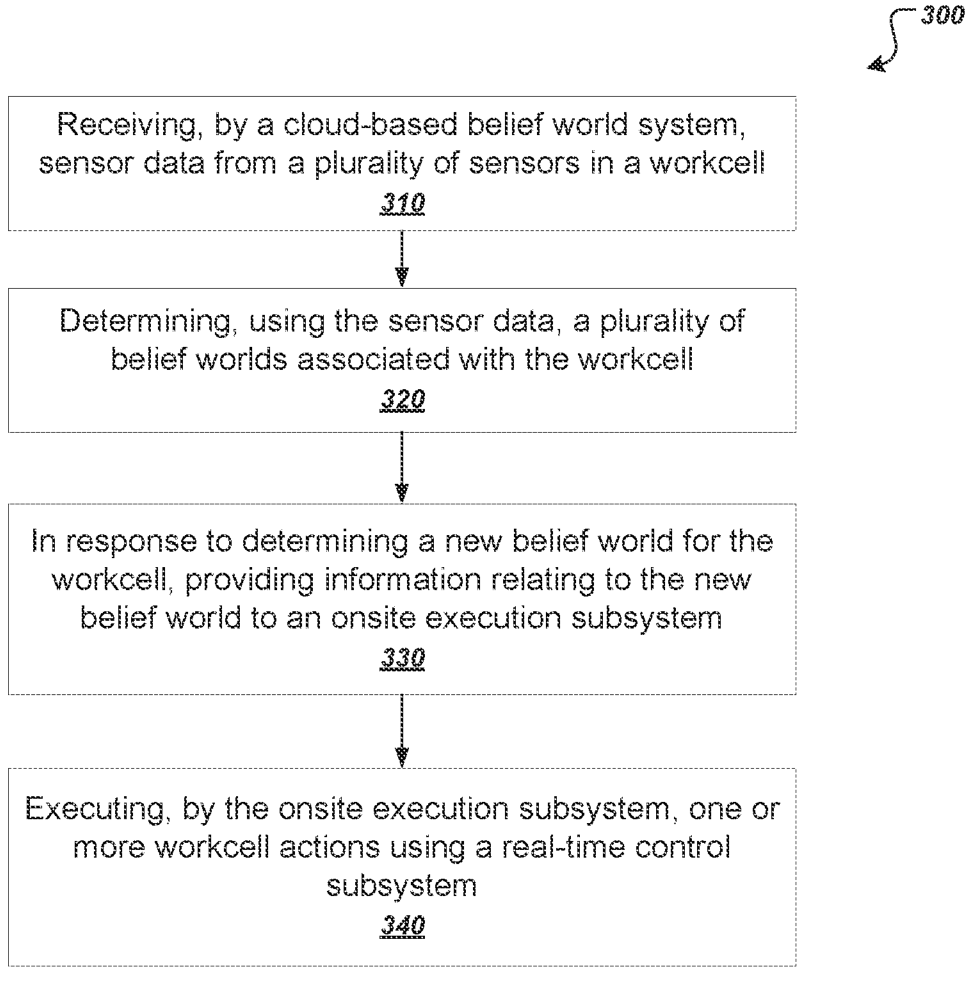
FIG. 3 is an example process for updating a robotics system belief world.

FIG. 3 is an example process 300 for updating a robotics system belief world.

In some implementations, the process 300 includes receiving, by a cloud-based belief world system logically arranged between one or more robots and one or more sensors, sensor data from a plurality of sensors in a workcell (310). In some cases, this sensor data can be measured from a variety of sensors in the workcell, to include force-torque sensors, optical sensors, accelerometers, cameras, or other sensors capable of being integrated with a robotics system. Additionally, this sensor data can reference one or more tasks conducted inside the workcell. For example, an insertion task can be accompanied by a measured force associated by the workcell to the task.

In some implementations, the process 300 includes determining, using the sensor data, a plurality of belief worlds associated with the workcell (320). In some cases, a belief world can be determined by the receipt of a certain combination of sensor data. For example, a force value of 25 Newtons accompanied by optical data showing an inserted connector may be sufficient to update the belief world for the corresponding skill to reflect the connector as "inserted." In some cases, individual robots or skills operating inside the workcell each have their own associated subset within the belief world. In some cases, these individual belief world subsets can be aggregated as "footprints" into a larger belief world. For example, the connector task belief world subset can be a constituent in a larger belief world for assembling a circuit card.

In some implementations, the process 300 includes, in response to determining a new belief world for the workcell, providing information relating to the new belief world to an onsite execution subsystem (330). In some cases, a new belief world can be determined upon receipt of a certain combination of sensor data. For example, for the connector insertion task described above, if the optical sensor detects that the connector has been removed from the slot, the belief world may be updated to "not inserted." In some cases, this update can be provided to other robots or skills in addition to those that provided the sensor data. For example, even though the optical sensor detected that the connector was removed from the slot, the "not inserted" belief world update can be provided to a downstream robotic arm that relies on the connector to complete a task. In this way, the individual workcell robots and skills can be made aware of belief world updates that may impact their specific tasking or belief worlds.

In some implementations, the process 300 includes executing, by the onsite execution subsystem, one or more workcell actions using a real-time control subsystem (340). In some cases, the real-time control subsystem can issue one or more commands to a robot or skill in order to effectuate an action in the workcell. For example, when receiving the indication of a "not inserted" belief world associated with the connector insertion task described above, the real-time control subsystem can command a robot arm to perform the insertion task.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAS, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising:

a physical robot in a physical workcell;

an onsite execution subsystem that is configured to control the physical robot using a real-time control subsystem;

a cloud-based belief world subsystem that is configured to receive and store sensor data captured in the workcell, wherein the onsite execution subsystem is configured to use sensor data stored by the cloud-based belief world subsystem in order to control the robot using the real-time control subsystem.

Embodiment 2 is the system of embodiment 1, wherein the belief-world subsystem is configured to continually provide a cached copy of updated sensor data to the onsite execution subsystem, wherein the onsite execution subsystem is configured to read the cached copy of the updated sensor data in order to control the robot using the real-time control subsystem.

Embodiment 3 is the system of embodiment 1, wherein the cloud-based belief world subsystem makes the updated sensor data available to external systems through one or more application programming interfaces.

Embodiment 4 is the system of embodiment 1, wherein the cloud-based belief world subsystem is configured to store a copy of all sensor data in a cloud-based storage subsystem.

Embodiment 5 is the system of embodiment 4, wherein the onsite execution subsystem is configured to read sensor data stored in the cloud-based storage subsystem and to use the stored sensor data to effectuate a replay of a previous robot session.

Embodiment 6 is the system of embodiment 1, wherein the cloud-based belief world subsystem is configured to track movements of objects in the workcell, thereby enabling the real-time control subsystem to react to up-to-date position information.

Embodiment 7 is the system of embodiment 1, further comprising a belief world updater that receives sensor data from the workcell and updates one or more belief worlds based on an established sensor data source trust level.

Embodiment 8 is the system of embodiment 7, wherein the updated belief worlds are continually provided to the onsite execution subsystem.

Embodiment 9 is the system of embodiment 3, wherein the external systems are not co-located with the workcell.

Embodiment 10 is a method for controlling a robot comprising:

receiving, by a cloud-based belief world system, sensor data from a plurality of sensors in a workcell;

determining, using the sensor data, a plurality of belief worlds associated with the workcell;

in response to determining a new belief world for the workcell, providing information relating to the new belief world to an onsite execution subsystem; and executing, by the onsite execution subsystem, one or more workcell actions using a real-time control subsystem.

Embodiment 11 is the method of embodiment 10, further comprising:

in response to the cloud-based belief world subsystem receiving the sensor data from the workcell, establishing a figure-of-merit for each of the sensor data sources associated with the workcell.

Embodiment 12 is the method of embodiment 11, wherein providing information relating to the new belief world to the onsite execution subsystem is based on the associated sensor data figure-of-merit.

Embodiment 13 is the method of embodiment 10, wherein providing information relating to the new belief world to the onsite execution subsystem comprises providing the information to a local cache that can be read by the real-time control subsystem.

Embodiment 14 is the method of embodiment 10, further comprising providing the sensor data from the plurality of sensors and the plurality of belief worlds to external systems through one or more application programming interfaces.

Embodiment 15 is the method of embodiment 10, further comprising storing the plurality of belief worlds and sensor data associated with the workcell in a cloud-based storage subsystem.

Embodiment 16 is the method of embodiment 15, further comprising reading sensor data stored in the cloud-based storage subsystem to effectuate a replay of a previous robot session.

Embodiment 17 is the method of embodiment 10, further comprising tracking, using the cloud-based belief world subsystem, movements of objects in the workcell, thereby enabling the real-time control subsystem to react to up-to-date position information.

Embodiment 18 is the method of embodiment 10, wherein the new belief worlds are continually provided to the onsite execution subsystem.

Embodiment 19 is the method of embodiment 14, wherein the external systems are not co-located with the workcell.

Embodiment 20 is one or more non-transitory computer storage media encoded with computer program instructions that when executed by one or more computers cause the one or more computers to perform operations comprising:

receiving, by a cloud-based belief world system, sensor data from a plurality of sensors in a workcell;

determining, using the sensor data, a plurality of belief worlds associated with the workcell;

in response to determining a new belief world for the workcell, providing information relating to the new belief world to the onsite execution subsystem; and executing, by the onsite execution subsystem, one or more workcell actions using a real-time control subsystem.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method for controlling a robotic workcell comprising:

receiving, by a cloud-based belief world system, sensor data from a plurality of sensors in a workcell, wherein the workcell comprises a plurality of robots;

determining, using the sensor data, a belief world associated with the workcell, wherein the belief world comprises a plurality of belief world footprints, wherein each belief world footprint is associated with sensor data from a particular robot from among the plurality of robots within the workcell;

establishing a figure-of-merit for each of the belief world footprints;

determining at least one instance of conflicting sensor data from among different robots in the workcell;

resolving the conflicting sensor data using the belief world footprint with the higher figure-of-merit;

in response to resolving the conflict, creating a modified belief world using the belief world footprint with the higher figure-of-merit;

providing information relating to the modified belief world to the plurality of robots within the workcell; and executing, by the plurality of robots within the workcell, one or more workcell actions based on the modified belief world.

2. The method of claim 1, wherein providing information relating to the modified belief world to the plurality of robots within the workcell comprises providing the information to a local cache.

3. The method of claim 1, further comprising providing the sensor data from the plurality of sensors to external systems through one or more application programming interfaces.

4. The method of claim 1, further comprising storing the belief world and sensor data associated with the workcell in a cloud-based storage subsystem.

5. The method of claim 4, further comprising reading sensor data stored in the cloud-based storage subsystem to effectuate a replay of a previous robot session.

6. The method of claim 1, further comprising tracking, using the cloud-based belief world system, movements of objects in the workcell, thereby enabling the robotic workcell to react to up-to-date position information.

7. The method of claim 1, wherein the modified belief world is provided to an onsite execution subsystem.

8. The method of claim 3, wherein the external systems are not co-located with the workcell.

9. One or more non-transitory computer storage media encoded with computer program instructions that when executed by one or more computers cause the one or more computers to perform operations comprising:

receiving, by a cloud-based belief world system, sensor data from a plurality of sensors in a workcell, wherein the workcell comprises a plurality of robots;

determining, using the sensor data, a belief world associated with the workcell, wherein the belief world comprises a plurality of belief world footprints, wherein each belief world footprint is associated with sensor data from a particular robot from among the plurality of robots within the workcell;

establishing a figure-of-merit for each of the belief world footprints;

determining at least one instance of conflicting sensor data from among different robots in the workcell;

resolving the conflicting sensor data using the belief world footprint with the higher figure-of-merit;

in response to resolving the conflict, creating a modified belief world using the belief world footprint with the higher figure-of-merit;

providing information relating to the modified belief world to the plurality of robots within the workcell; and executing, by the plurality of robots within the workcell, one or more workcell actions based on the modified belief world.

10. The method of claim 1, wherein the modified belief world comprises inserting simulated geometry.

11. The method of claim 1, wherein the modified belief world comprises a substitution of a robot in the workcell.

12. The method of claim 7, wherein the onsite execution subsystem is not associated with the workcell.

13. The method of claim 5, further comprising: identifying a fault in the previous robot session; and in response to identifying the fault, repeating one or more operations of the previous robot session.

14. The method of claim 1, further comprising aggregating a plurality of belief worlds to create a merged belief world.

15. The method of claim 14, wherein each of the belief worlds of the plurality of belief worlds represents a particular task in a series of tasks represented by the merged belief world.

16. The method of claim 1, wherein the providing of information relating to the modified belief world is performed responsive to a subscription to the cloud-based belief world system.

17. The method of claim 10, further comprising: responsive to inserting the simulated geometry into the modified belief world, planning a new task in the workcell that avoids the simulated geometry.

18. The method of claim 1, wherein at least one belief world footprint among the plurality of belief world footprints is determined responsive to a receipt of sensor data from at least two different sensor types for a particular task.

* * * * *